(12) United States Patent
Kraitsman et al.

(10) Patent No.: US 9,641,550 B2
(45) Date of Patent: May 2, 2017

(54) NETWORK PROTECTION SYSTEM AND METHOD

(71) Applicant: Seculert Ltd., Petach Tikva (IL)

(72) Inventors: Ron Kraitsman, Petach Tikva (IL); Alex Milstein, Raanana (IL); Aviv Raff, Kiryat Ono (IL); David Matot, Kiryat Ono (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 14/991,957

(22) Filed: Jan. 10, 2016

(65) Prior Publication Data

US 2016/0127413 A1 May 5, 2016

Related U.S. Application Data

(63) Continuation of application No. 13/810,450, filed as application No. PCT/IB2011/053253 on Jul. 21, 2011, now Pat. No. 9,270,690.

(60) Provisional application No. 61/366,168, filed on Jul. 21, 2010, provisional application No. 61/411,006, filed on Nov. 8, 2010, provisional application No. 61/482,223, filed on May 4, 2011.

(51) Int. Cl.
*H04L 29/06* (2006.01)
*G06F 21/55* (2013.01)
*G06F 17/30* (2006.01)

(52) U.S. Cl.
CPC .... *H04L 63/1491* (2013.01); *G06F 17/30864* (2013.01); *G06F 21/554* (2013.01); *H04L 63/1408* (2013.01); *H04L 63/1416* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 7,904,958 B2* | 3/2011 | Lee | H04L 51/12 709/206 |
| 8,156,541 B1* | 4/2012 | Thomas | H04L 63/1491 726/13 |
| 8,510,840 B2* | 8/2013 | Futamura | H04L 63/1416 713/165 |
| 8,549,642 B2* | 10/2013 | Lee | H04L 12/585 709/203 |
| 8,612,523 B1* | 12/2013 | Oliver | H04L 63/1408 709/206 |
| 8,769,684 B2* | 7/2014 | Stolfo | G06F 21/55 709/224 |

(Continued)

*Primary Examiner* — Michael R Vaughan
(74) *Attorney, Agent, or Firm* — M&B IP Analysts, LLC (57) ABSTRACT

Systems and methods for protecting at least one client from becoming part of at least one botnet by monitoring and analyzing botnet communications to and from criminal servers and identifying at least one botnet attack on at least one client. The system may comprise virtual machines deliberately infected with malicious content and operable to record botnet communications to and from criminal servers. The virtual machines are in communication with a processing unit configured to index data collected. Data related to the prevalence of cyber threats may be presented to users in response to queries.

11 Claims, 9 Drawing Sheets

(56) References Cited

U.S. PATENT DOCUMENTS

| | | | |
|---|---|---|---|
| 8,793,787 B2* | 7/2014 | Ismael | G06F 21/566 |
| | | | 726/1 |
| 9,009,829 B2* | 4/2015 | Stolfo | G06F 21/554 |
| | | | 726/23 |
| 2008/0080518 A1* | 4/2008 | Hoeflin | H04L 63/1416 |
| | | | 370/395.42 |
| 2008/0307526 A1* | 12/2008 | Chung | H04L 63/1416 |
| | | | 726/23 |
| 2009/0249481 A1* | 10/2009 | Long | H04L 12/585 |
| | | | 726/22 |
| 2009/0254989 A1* | 10/2009 | Achan | H04L 63/1441 |
| | | | 726/22 |
| 2010/0037314 A1* | 2/2010 | Perdisci | H04L 63/1416 |
| | | | 726/22 |
| 2010/0067377 A1* | 3/2010 | Wang | H04L 63/1441 |
| | | | 370/230 |
| 2010/0115621 A1* | 5/2010 | Staniford | H04L 63/1416 |
| | | | 726/25 |
| 2010/0162350 A1* | 6/2010 | Jeong | H04L 63/1416 |
| | | | 726/1 |
| 2011/0126136 A1* | 5/2011 | Abella | H04L 43/028 |
| | | | 715/764 |
| 2012/0203900 A1* | 8/2012 | Wang | H04L 63/1441 |
| | | | 709/224 |
| 2012/0204264 A1* | 8/2012 | Jiang | H04L 41/12 |
| | | | 726/23 |
| 2013/0091570 A1* | 4/2013 | McCorkendale | G06F 21/56 |
| | | | 726/23 |
| 2014/0245436 A1* | 8/2014 | Dagon | H04L 29/12066 |
| | | | 726/22 |

* cited by examiner

|  | "DOMAIN NAME" FIELD | "TYPE" FIELD | USER TYPE |
|---|---|---|---|
| ACCESSING INTERNAL WEB APPLICATIONS | intranet.mycompany.com | INTERNAL | EMPLOYEE |
| ACCESSING CORPORATE RESOURCE USING VPN | sslvpn.mycompany.com | EXTERNAL FOR EMPLOYEES | EMPLOYEE WORKING FROM REMOTE |
| SENDING EMAIL USING OWA OR OUTLOOK OVER HTTP | owa.mycompany.com | EMAIL ONLY | EMPLOYEE USING EMAIL |
| CUSTOMER USING COMPANY'S PORTAL | customerportal.mycomapny.com | EXTERNAL | CUSTOMER |
| PARTNER ACCESSING COMPANY'S RESOURCES | partnerportal.mycompany.com | EXTERNAL FOR PARTNERS ONLY | PARTNERS |

NETWORK PROTECTION SYSTEM AND METHOD

CROSS-REFERENCE TO RELATED APPLICATIONS

This application is a Continuation of U.S. patent application Ser. No. 13/810,450, filed Jan. 16, 2013, which is a 371 of International Patent Application No. PCT/IB2011/053253, filed Jul. 21, 2011, which claims the benefit of priority from U.S. Provisional Patent Application No. 61/366,168, filed Jul. 21, 2010, U.S. Provisional Patent Application No. 61/411,006, filed Nov. 8, 2010, and U.S. Provisional Patent Application No. 61/482,223, filed May 4, 2011, the contents of which are incorporated by reference in their entirety.

FIELD OF THE INVENTION

The present invention relates to internet security. In particular the invention relates to protecting computers and networks from becoming part of a botnet.

BACKGROUND

Internet security is challenging, and the types of threats computers are exposed to are rapidly increasing. Software infecting computers is commonly known as malware. Malware types include examples such as worms, bankers, proxy, DDoS, password stealers, fake anti-virus, spammers, downloaders and the like.

The term 'worms' is given to self-replicating malware which uses a computer network to send copies of itself to other computers on the network. The term 'bankers' is given to malware which steals banking information.

The term 'proxy' is given to malware which sets the infected computer as a proxy between other computers (for example as used for Fast Flux and the like). The term 'DoS' is given to malware which is used for Denial-of-Service attack against websites or networks.

The term 'password stealers' is given to malware which steals any type of information.

The term 'Fake Anti-Virus' is given to malware which misleads users into paying for a fake removal of malware.

The term 'Spammers' is given to malware which uses an infected computer to send spam emails.

The term 'Downloaders' is given to malware which downloads other malware to an infected computer.

Malware types may be differentiated according to criteria such as self-distribution, point of control, data stealing, level of protection and the like. The self-distribution is the capability of the malware to spread itself to other computers. Point of control refers to the capability of the malware to be controlled by a central remove server, for example its vulnerability to receiving commands, sending information, automatic updating and the like. Data stealing refers to the capability of the malware to send information from the computer to a remote server.

The level of protection of malware refers to the systems put into place by the malware author in order to decrease detection by end point security products, such as anti-virus software, malware detection software, and the like, and gateway protection software, such as firewalls and the like. For example, some malware is designed to be polymorphic, for example changing executable signature, while maintaining the malware payload. Some malware may use encryption of the network communication between the malware and a drop zone at a criminal server.

Cyber criminals use different methods to infect machines with malware. Examples include the social engineering, exploitation of specific vulnerabilities, use of exploit kits, distribution of email attachment and the like.

Social engineering is one method for deceiving users into downloading malware. In one example a website which offers to show a video. In in order to view the video the user is required to download software purporting to be an update for commonly used software such as Adobe Flash or the like. In reality the update is an executable file installing malware onto the host.

Specific vulnerability may be identified and exploited, certain malicious webpages, for example, exploit known vulnerabilities of a browser, application or operating system in order to install the malware surreptitiously.

Exploit kits are a collections of exploits traded in the underground, and used by cyber criminals to increase the probability of installing the malware surreptitiously.

Email attachments are often used to distribute malware to unsuspecting recipients. For example, executable files may be attached to spam email or email purporting to be from a member of the user's contact list. A botnet generally comprises a set of malware infected computers, or bots, all connected to a common criminal sever, also known as a bot server, or a bot server set comprising a plurality of bot servers. The bot server or bot server set may include a command and control module, which is able to control all the infected computers, an update module which updates the malware code in the infected computers, and a drop zone for collecting data received from the infected computers.

SUMMARY OF THE EMBODIMENTS

It is according to one aspect of the current disclosure to present a system for protecting at least one client from becoming part of at least one botnet. The client may have at least one client address, and the botnet may be controlled by at least one criminal server having at least one bot address. The botnet may be operable to communicate data between the at least one client address and the at least one bot address. The system may comprise at least one processing unit, the processing unit configured to classify the data into indexed data and to filter the indexed data into filtered data pertaining to data queries; at least one storage unit configured to store the indexed data; and at least one communication unit configured to receive the data queries and send filtered data pertaining to the data queries.

Variously, the at least one client address and the at least one bot address may be selected from a group of formats consisting of: IP addresses, IPv4 addresses, IPv6 addresses, MAC addresses, Virtual IP addresses representing load-balanced clusters, domain name mappings, host names, domain controllers and combinations therof.

Where appropriate, the at least one data collection system may be configured to collect the bot addresses from a plurality of sources. For example, the plurality of sources may be selected from a group consisting of: data sent from the at least one client address to the at least one bot address, data sent from the at least one bot address to the at least one client address, malware sensors, public domain knowledge, publically available files located on criminal servers, open access logs on servers, sinkholes, sandboxes, intrusion detection systems, intrusion prevention systems, anti-virus logs, firewall logs, data leakage prevention systems, operating system logs, URL filtering systems, security information, event management systems and combinations thereof.

Accordingly, the data collection system may comprise at least one machine operable to join at least one botnet. Optionally, the at least one machine is a virtual machine. The machine may be operable to communicate with the at least one criminal server. Furthermore, the machine may be operable to download malicious content from the at least one criminal server. Moreover, the machine may be operable to communicate with the at least one processing unit. Alternatively or additionally, the machine may be operable to send the malicious content to the at least one processing unit.

Where required, the machine may be operable to receive machine-specific-data-queries and to analyse the malicious content. Accordingly, the machine may be operable to classify the malicious content into machine-specific-indexed-data and filter the machine-specific-indexed-data into machine-specific-filtered-data pertaining to the machine-specific-data-queries. In some embodiments, the machine may be capable of storing machine-specific-indexed-data in the storage unit.

Where appropriate, the machine further comprises a recording unit operable to record communication between at least one client address and the at least one bot address. Optionally, the system may further comprise at least one display unit configured to display the filtered data pertaining to the data queries.

According to another aspect of the disclosure a method is taught for protecting at least one asset from becoming part of at least one botnet, the asset having at least one client address and the botnet being controlled by at least one criminal server having at least one bot address, the botnet operable to communicate data between the at least one client address and the at least one bot address. The method may comprise: defining at least one asset which requires botnet protection, the asset having at least one asset address; processing traffic sent to and from the at least one asset address and the at least one bot address; and identifying at least one bot attack pertaining to the at least one asset.

Defining the at least one asset may comprise defining at least one IP range representing the asset. Alternatively or additionally, defining the at least one asset may comprise defining at least one network interface representing the asset.

Optionally the method further comprises collecting potential bot data. Optionally, collecting potential bot data comprises: exposing at least one honeypot asset having at least one honeypot address to a the traffic; monitoring honeypot-traffic, the honeypot-traffic traveling between the at least one honeypot address and the at least one bot address; and identifying bot-traffic patterns from the honeypot-traffic, the bot-traffic patterns indicative of at least one bot-infected asset.

Where appropriate, processing traffic sent to and from the at least one asset address and the at least one bot address may comprise: classifying the traffic into classified-traffic, the classifying performed according to the at least one IP range representing the at least one asset and according to the bot-traffic patterns.

In some embodiments, identifying the at least one bot attack pertaining to the asset comprises filtering the classified-traffic according to the at least one asset address.

Optionally, the method may further comprise displaying the at least one bot attack pertaining to the at least one asset. Furthermore, the method may further comprise mitigating the at least one bot attack.

Still another aspect of the disclosure is to teach a method for protecting at least one client network from security threats. The method may comprise connecting to a remote intelligence gathering system, the system comprising at least one database and at least one virtual machine connected to a computer network, the virtual machine operable to communicate with at least one criminal server, to download at least one malicious software program, to analyse the malicious software, to store data pertaining to the malicious software, and to index the data in the database; sending a query to the intelligence gathering system, the query relating to characteristics of the client network; and receiving intelligence from the intelligence gathering system pertaining to the characteristics of the client network.

Optionally, the virtual machine is operable to join at least one botnet. As required, the virtual machine may be operable to record communication between the at least one botnet and the at least one criminal server.

Such an intelligence gathering system may be operable to identify at least one future domain name used by the criminal server, register the domain name, record data sent to the domain name from other members of the botnet. Optionally, the virtual machine is further operable to identify other members of the botnet Variously, collected intelligence may comprise at least one item selected from: at least one current IP address of the criminal server, at least one future IP address of the criminal server, at least one current URL of the criminal server, at least one future URL of the criminal server, at least one current domain name of the criminal server, at least one future domain name of the criminal server, at least one geographical location of the security threat; at least one vulnerability exploited by the malicious software, time stamps and combinations thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE FIGURES

For a better understanding of the invention and to show how it may be carried into effect, reference will now be made, purely by way of example, to the accompanying drawings.

With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawing making apparent to those skilled in the art how the several forms of the invention may be embodied in practice. In discussion of the various figures described herein below, like numbers refer to like parts. The drawings are generally not to scale.

In the accompanying drawings:

FIGS. 6A-F represent presentation options as screenshots in accordance with embodiment of the present disclosure;

DETAILED DESCRIPTION OF THE SELECTED EMBODIMENTS

Various embodiments of a bot protection system and method are disclosed hereinbelow. The system includes cyber threat management services which are capable for minimizing business risks by providing real time detection of cybercrime events. The system is configured to gather and analyze intelligence from multiple sources, identify malicious content, hostile servers and botnets. The system is further capable of pin-pointing corporate specific attacks, alerting a user to specific personal or organizational assets that may be compromised, and potentially removing malicious content from infected assets. Using the system, users, such as network administrators and the like, may be capable of protecting or sealing a domain against cyber penetration and leakage. Furthermore users may be able to identify cyber adversaries in real time and gain accurate visibility to compromised assets.

In contradistinction to other malware protection systems known in the art, no software or hardware installations or network configuration changes are required upon any computers or other devices within the protected organization.

The system may be capable of providing extensive coverage of many malware family types, regardless of their characteristics and methods of infection.

Assets may be referred to herein as 'clients' and are typically defined by at least one 'client address'. Criminal servers are also typically defined by at least one 'bot address'. In preferred embodiments, a 'client address' or a 'bot address' is an IP address (such as IPv4 or IPv6). MAC addresses, Virtual IP addresses representing elements such as load balanced clusters, domain name mappings or the like may also be used as client addresses or bot addresses.

It will be demonstrated hereinbelow, that 'client addresses' are typically defined by a supervisor or an administrator of an asset or a group of assets, for example a domain administrator. 'bot addresses' are addresses pertaining to at least one criminal server located in a networks such as public or private networks, the bot addresses accessible directly or indirectly by clients and assets in the same network or in other networks.

Figure 1:
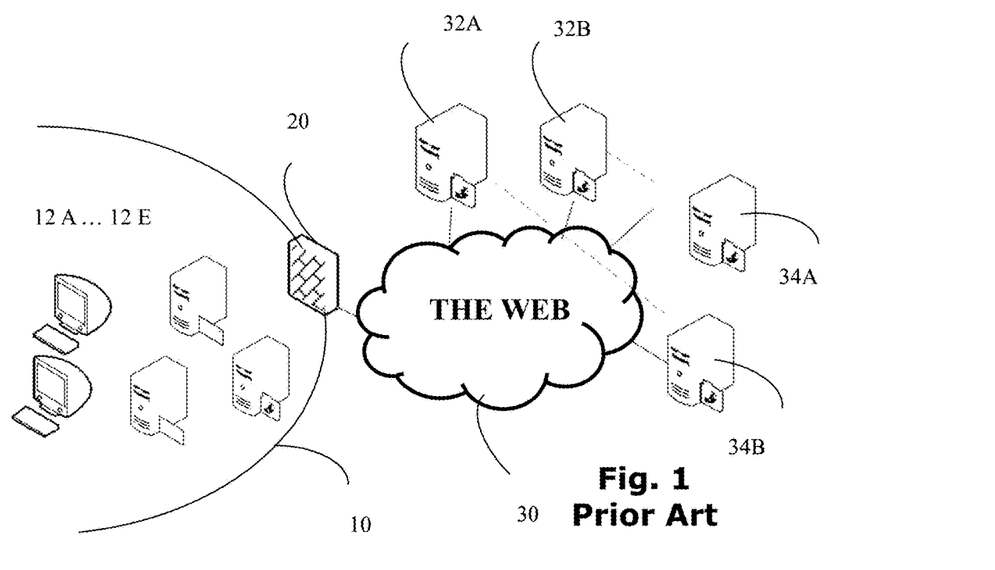
FIG. 1 represents an example of a prior art network topology.

Reference is now made to FIG. 1 showing a typical network topology as known in the art. A private network 10 comprises a plurality of client computers 12A-E having a common gateway 20 to a public network 30 such as but not limited to the internet. It is noted that where required the gateway 20 may which may also serve as a firewall. The public network 30 comprises a plurality of servers, for example web servers 32A and 32B and bot servers 34A and 34B.

The public network, such as the internet or 'the Web', may be accessed by many different clients. The public network may contain servers such as innocent content servers and malicious bot servers. Content servers such as but not limited to commonly used domains CBS.com and USAToday.com, may provide content accessible by other computers connected to the public network either directly or through a network gateway. Criminal servers, such as bot servers, may exploit the public network to gain access to client computers optionally residing in public, private and protected networks.

The firewall 20 may be used to protect the private network 10 from attack. It is noted however that known firewall applications typically require on-site installation of hardware and/or software within the private network or on the network edge. Furthermore, the client computers of the private network may be portable computers or the like which may be used in multiple environments including environments unprotected by firewalls and the like.

Figure 2:
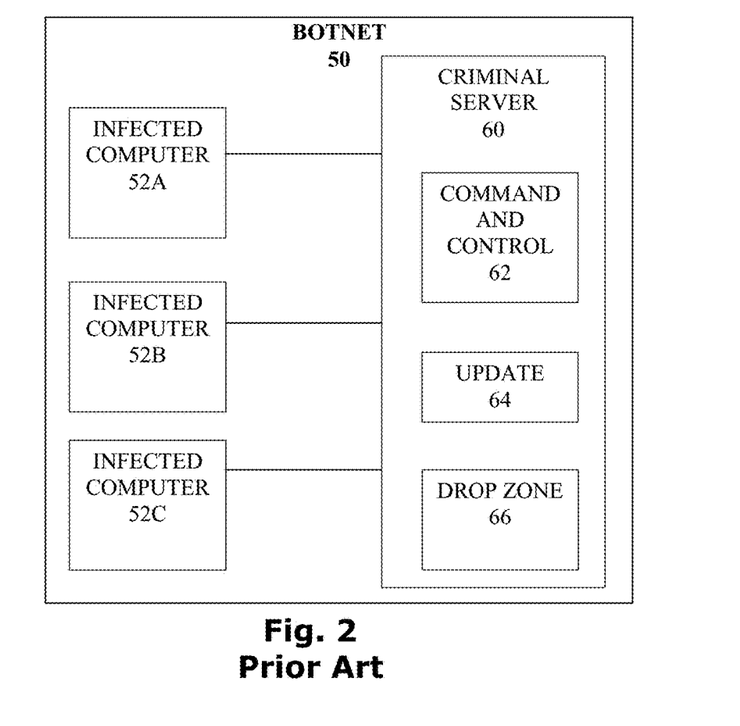
FIG. 2 represents a block diagram representing a typical botnet as known in the art.

Reference is made to the block diagram of FIG. 2 representing a typical botnet 50 as known in the art. In this embodiment, botnet 50 comprises a plurality of infected computers 52A, 52B and 52C in communication with a bot server 60 comprising a command and control component 62, a bot update component 64 and a drop zone 66.

Figure 3A:
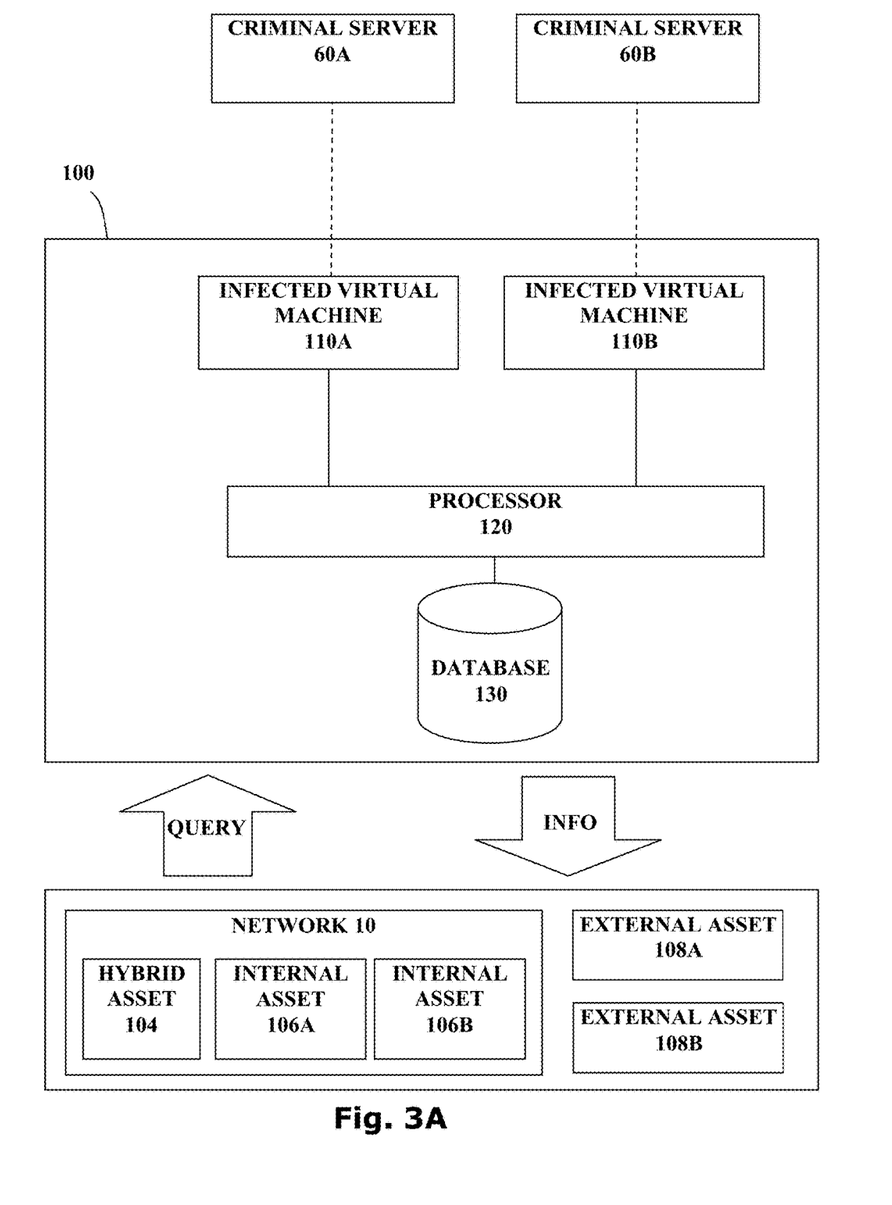
FIGS. 3A and 3B are block diagrams representing selected components of a bot protection system.

Reference is made to FIG. 3A illustrating a basic embodiment 100 of the bot protection system and method.

A user, such as a network manager may communicate with a remote intelligence gathering system 100. The user may send queries relating to various characteristics of the client network 10 to the network manager and receive therefrom information relating to possible threats to the security of computers in a client network 10.

In this embodiment, client network 10 is shown having one hybrid asset 104, internal assets 106A and 106B, and external assets 108A and 108B. Assets may vary in number and type, and include combinations and sub-combinations of devices such as PCs, laptops, PDAs or the like.

The remote intelligence gathering system 100 may include a processing unit 120, a database 130 and at least one virtual machine 110. Alternatively, non-virtual machines may be used, independently or in combination with virtual machines. The machines are operable to join at least one botnet, and to communicate with at least one criminal server. Preferably, machines are operable to download malicious content from at least one criminal server, and optionally install the malicious content, manually or automatically.

In this embodiment, virtual machines 110A and 110B are each infected with at least one bot and are in communication with criminal bot servers 60A, 60B. It is noted that according to various embodiments, multiple virtual machines may be provided and operable to join many botnets. Where appropriate individual virtual machines may become members of a plurality of botnets and thereby gather data from more than one criminal server.

The virtual machines 110A and 110B may be operable to communicate with sources of malicious software and deliberately download malware and other types of malicious content, thereby serving as honeypots and potentially joining at least one botnet. The machines are further capable of communicating directly or indirectly with a processing unit 120. Processing unit 120 may be configured and operable to analyze malware. and to report communications between the command and control component of a criminal server 60A, 60B and the members of the botnet, members such as infected virtual machines 110A and 110B.

A storage unit in the form of database 130 is provided to store the information gathered by the virtual machines 110A, 110B. The storage unit may be used to store data in various forms, filtered or unfiltered. Data forms may be records of raw traffic, bot-traffic patterns indicative of bot-infected assets, classified traffic, filtered traffic or the like. For example, traffic may be classified in accordance with 'client addresses' representing corporate assets to be protected, 'bot addresses' representing criminal servers, known bots, traffic dates, or any other classification scheme optionally defined by a user.

Figure 3B:
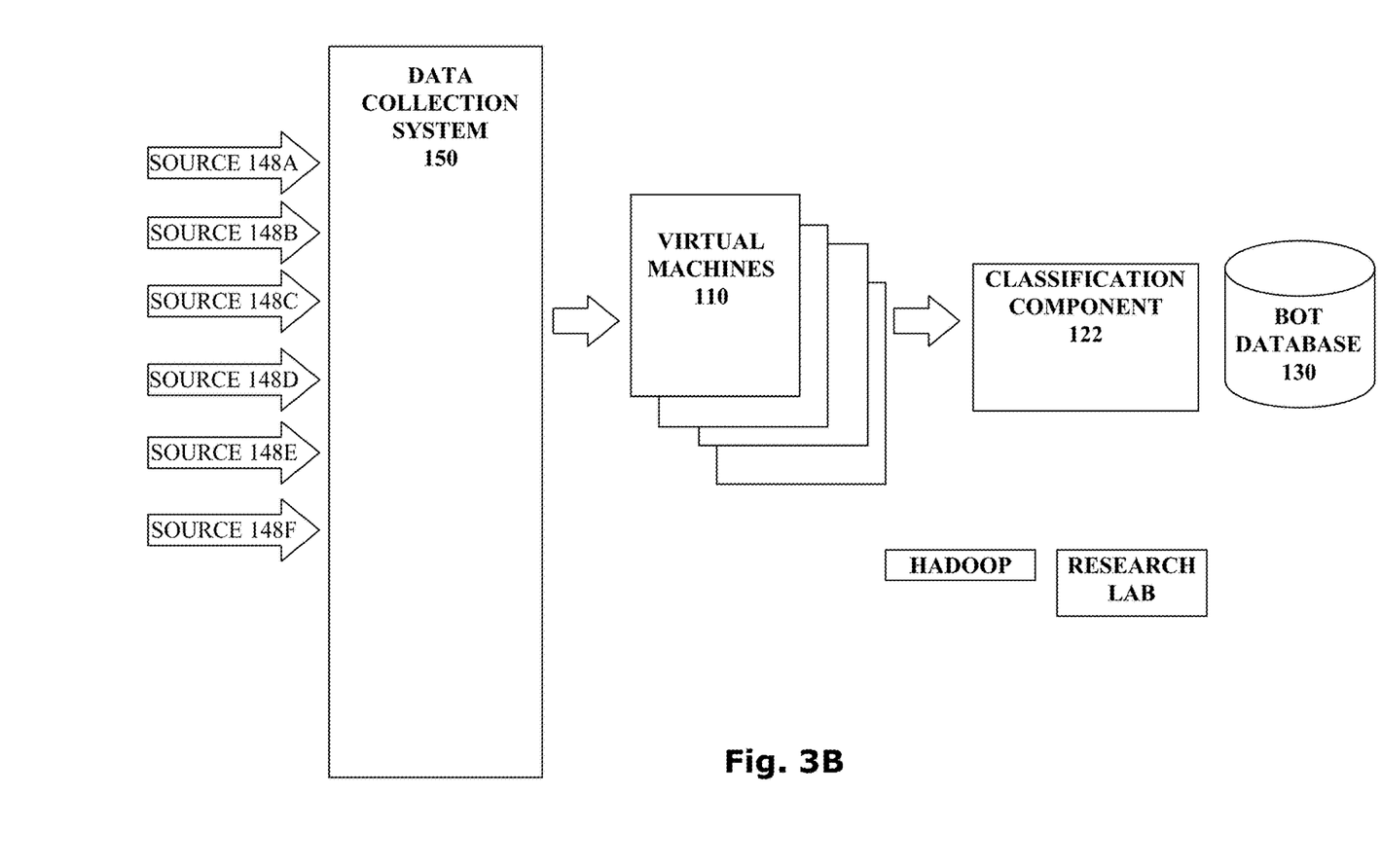

Reference is made to the schematic diagram of FIG. 3B, illustrating various components of a remote intelligence gathering system 100 and the mode of operation between them.

A general system includes a data collection system 150 capable of collecting data from a plurality of sources 148A-F. Data collection may make use of accessible elements such as publically available files located on criminal servers, open access logs on servers, sinkholes and the like. In preferred embodiments, data collected is analyzed and synthesized to produce bot addresses pertaining to criminal servers controlling botnets. A single criminal server may control a plurality of botnets, a collection of servers may control a single botnet, or a combination of servers can control a number of botnets according to various botnet topologies known in the art.

Virtual machines 110 are then infected with malware according to the data collected by data collection system 150. A classification sub-component 122 of processing unit 120 may be used to classify bots, and the classified bot info may be stored in bot database 130. Various techniques may be used such as described below.

Research

Researching public domain knowledge may comprise research samples from malware gathered in public web sites and databases.

Searching may be performed for information to be correlated to organizational assets which are backdoors of the organization, for example using domain name and IP range belonging to the organization.

Referring back to FIG. 3A, organizational assets may be classified into internal assets 106, external assets 108 and hybrid assets 104. Internal assets include clients within the internal network. External assets include customers/partners of the organization, for example customers of a bank, or the like. Hybrid assets include enterprise employees working from a remote location. Hybrid assets may be identified using heuristics, for example and without limitation according to access type (https communication into the organization Malware Sensors Malware sensing may be performed by virtual machines or computers infected with the malware. Infection can be performed manually or automatically as required.

Tracking systems may be installed, possibly in the criminal server, which are capable of following the communication generated from the malware.

Data Storage

Figure 4:
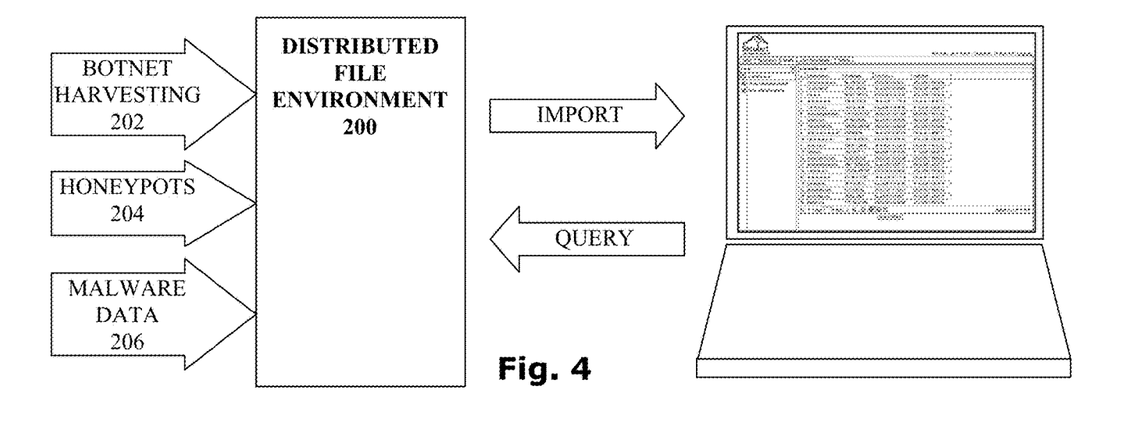
FIG. 4 represents the components of distributed file environment.

Data may be accessed, possibly using distributed file system tools, such as Apache's Hadoop software framework or the like, as illustrated in FIG. 4. In this embodiment, distributed file environment 200 is capable of addressing data collected from sources and techniques, such as but not limited to botnet harvesting 202, honeypots 204 and malware data 202. The distributed file environment 200 typically supports data-intensive distributed applications and enables applications to work with thousands of nodes and to manage large amounts of data. A cluster, for example, comprising a master and a plurality of worker nodes may be created for receiving raw data.

A 'Research Lab' may be used to collect data. Data collection may include the collecting of computer IPs associated with terminals which communicated with a bot server. In some cases it is possible to retrieve other attributes such as the MAC address of infected computers, if the bot server collects this data.

Indexing

The output generated by the malware may be classified, indexed or otherwise organized. Classification may be performed for malware that communicates with a bot management server.

Lists may be produced of bot management servers with which the malware communicates. The list may include the, URLs, domain names or Internet Protocol (IP) addresses of bot management servers, but other attributes such as the threat types being used by the server may also be collected.

Data Analysis

Data collected in the Research lab may be analyzed. Such analysis may result in identification of bot servers (IPs/URLs) and identification of infected clients communicating with the bot servers. Furthermore, the security risk presented by various threats may also be graded.

Client Mapping

Data may be mapped according to queries provided by a customer regarding specific computers in the organization which may be bot targets. Data queries may include an information set about the computers. The information may include the IP address of the bot target computer, a timestamp of communication with malware server, a Bot server IP address or the like.

Alternatively, the information set may include a unique identifier of the bot target computer (for example and without limitation a GUID of the machine which includes name of machine), or any other information set components which are capable of providing sufficient criteria for mapping the data collected.

It is noted that using the data collected, the identity of the infected computers may be determined.

Another data collection technique involves a method of automating sinkhole data collection for example by redirecting of traffic intended for a bot server to a system database. The automated sinkhole data collection typically uses a load balanced cluster with high availability.

The Malware may be used to generate a dynamic or static list of domains. Generation may be performed either with an algorithm or via a configuration file. The system automatically identifies the domains, registers them and points them to a Sinkhole server for the data collection.

Figure 5:
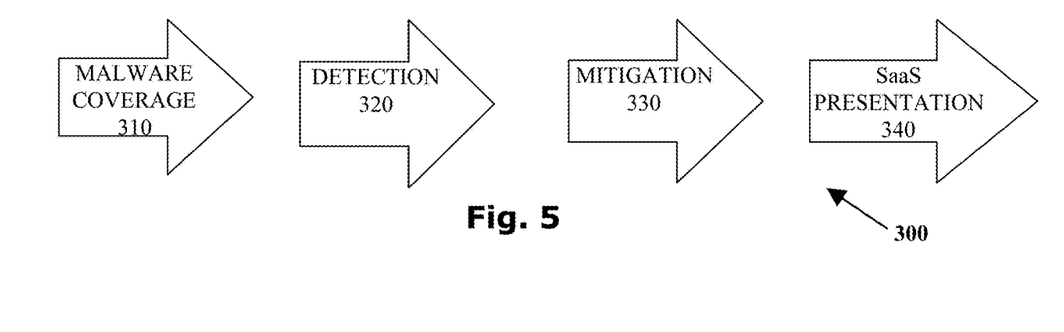
FIG. 5 represents the steps in a bot protection method.
Figure 6C:
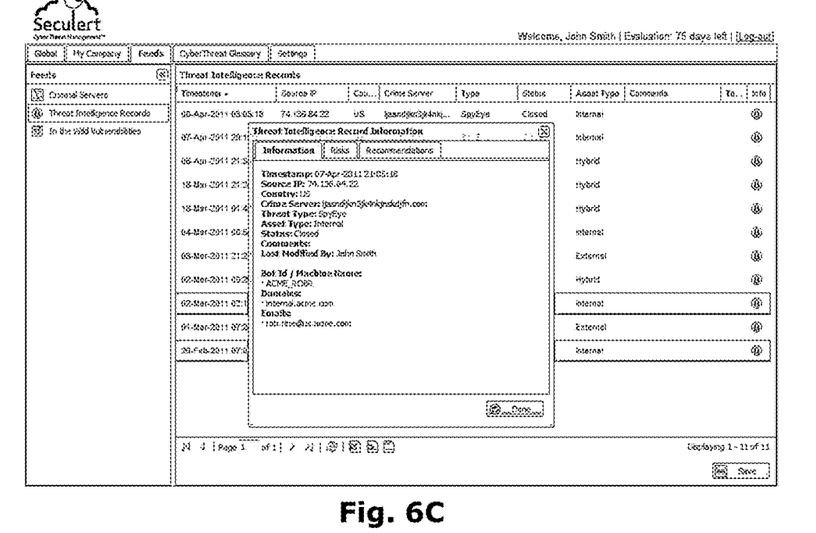
Figure 6D:
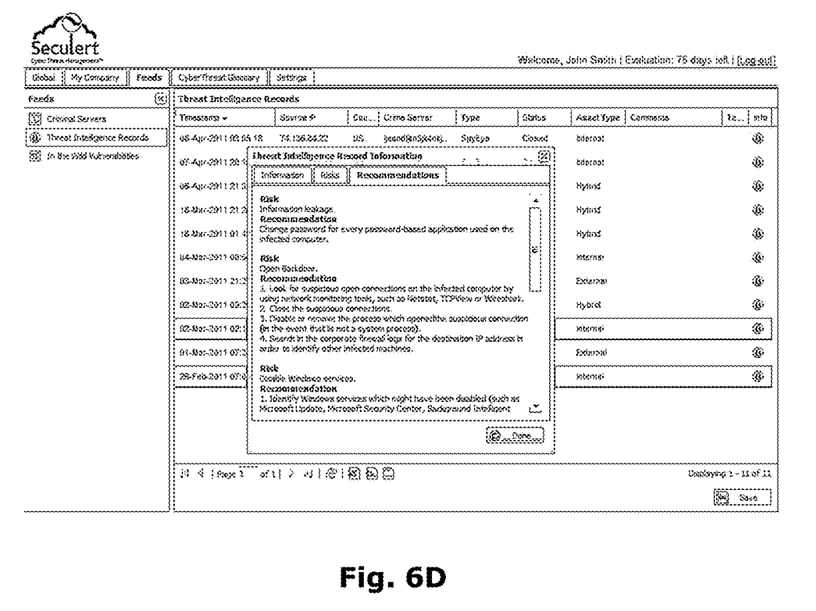

Reference is now made to FIG. 5 illustrating a bot protection method 300. The method comprises malware coverage 310 as illustrated above, bot servers detection 320, mitigation 330 and presentation 340.

A detection component enables detection 320 of various malware family types, executable files and exploit kits or the like. In some cases, a generic detection API may be provided to organizations. Amongst others, the detection component may be configured to perform various functions including but not limited to the following examples.

Data gathering may be performed using web sensors crawling over the internet. Web sensors may inspect malware samples. For example, web sensors crawling over the internet may review the pages a user is looking at to detect problematic web pages, for example pages which exploit a weakness or download a file to the user's computer. Alternatively or additionally, community based forums may be accessed, such as malwaredomainlist.com or the like. Data may also be gathered by collecting malware from partners and other customers Multiple virtual environments may be created to be deliberately infected by the malware Malware network communication with external servers may be recorded and automatically analyzed.

Malware may be reverse engineered for special capabilities such as communication encryption keys.

Malware activity may be imitated using external servers in order to get updates or to send false data.

The probability may be determined that a machine is part of a network's assets or contains employee identities. Probability may be determined, for example, by setting a comparative scoring system. Each score represents the probability of leaked traffic being part of the network's assets or identity.

In some embodiments, scoring may be set between 1-10, wherein 1 stands for the lowest probability and 10 stands for the highest probability. The score may be determined by metadata such as:

Visited host (per domain type): External , Internal
Domain Controller Name
Posted Data Such as Email address
Protected Storage such as Cookies within Corporate IP address Future malicious domains may be predicted before they are registered for cyber criminal activity. For example, malware may incorporate or access a list of domains, IP addressses or the like, which may be registered at some point in the future. The detection component 320 may be operable to inspect such lists and alert a user to the future threat imposed by such targets. It will be appreciated that this prediction feature may be used as a superior alternative to zero-day protection.

The system may further include a Mitigation component 330, which enables information distribution to the user. The mitigation component may be operable to imitate malware activity, scan for suspicious network activity and, alert the user of potentially infected machines, and perform actions such as but not limited to uninstalling malware from infected machines. Mitigation may be automatic or manual, according to settings defined by the organization's administrator and/or the administrator of the infected machine.

It is noted that malware activity may be imitated allowing unique access to data on drop-zone servers, Command & Control servers, servers hosting exploit kits or the like.

Furthermore, scanning may be caried out for network activity originating from infected machines within corporate networks and targeting external bot servers. In preferred embodiments, the scan is automated.

The system may further include a presentation component 340, which enables information to be presented to the user.

Various presentation options are shown in the screenshots of FIGS. 6A-6F.

Referring particularly to the screenshot of FIG. 6F, dashboard presentation of global and corporate specific information, may include elements such as but not limited to a map of malware external servers 602, lists of top rated threats 610, and visual representations of online threat statistics, possibly in the form of a pie chart 604 or threat level gauge 606, threat level graph 608.

It is particularly noted that the statistics may be presented relating to global threats and /or corporate specific threats. Threats may be presented related to corporate specific compromised machines as well as statistics of corporate data The lists of top rated threats 610, for example may present the highest ranked vulnerabilities exploited by cyber criminals, possibly based on exploit kits analysis found on external servers.

As noted, global and corporate threat metrics according to the current and over time threat level may be presented visually in a number of ways as will occur to those skilled in the art including, inter alia, charts, bar charts, histograms, tables, pie charts, gauges, graphs and the like.

The bot protection system and method may further include a configuration component. In some embodiments, the configuration component allows for effective, quick and substantially simple setup of the system within enterprises. Usability of the configuration and setup components may enable enterprises to benefit from the system within a matter of minutes.

Basic configuration requires that a supervisor or an administrator provides initial data to the bot protection system. In some embodiments for organizations such as but not limited to medium and large corporates, the supervisor is defined in the user accounts of the organization.

Initial data provided to the system typically includes parameters such as but not limited to External IP ranges and Network Interfaces (otherwise known as Web Interfaces) .With regard to external IP ranges—the supervisor may indicate a plurality of IP ranges which he considers to be part of his organization whether internally or part of a perimeter network such as a demilitarized zone (DMZ). The IP ranges may be indicated in the form of IPv4 addresses, IPv6 addresses, or any other form as suit requirements. The IPs can be inserted in different formats such as CIDR, IP Ranges, Net Masks or the like. External IP ranges may be deducted automatically from the Internal/DMZ IP ranges that the administrator indicated, or alternatively specified explicitly by the supervisor. The supervisor may also indicate IP ranges which are not to be examined by the bot protection system, or IP ranges to be examined with different security levels by the bot protection system.

With regard to network interfaces, the supervisor preferably enters at least one internal and at least one external website name, or other resources that the organization's customers/ partners/employees or other relevant parties may browse. In order to access corporate resources over a public network, for example and without limitation, by means of VPN, the supervisor preferably indicates the type of network access, for example and without limitation, internal access, external access, for employee only access, partner only access or the like. Interface names may be resolved by a plurality of methods, such as but not limited to domain name server (DNS) lookup.

Figure 7:
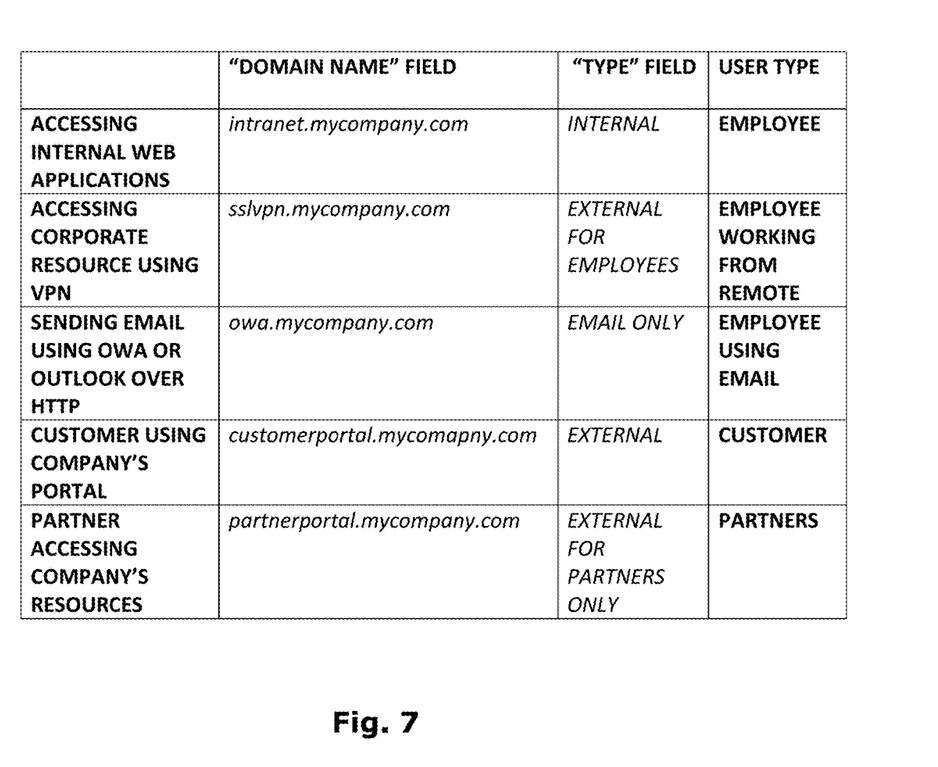
FIG. 7 is a table representing examples of web interface settings which can be entered by a supervisor.

Some web access examples are demonstrated in the table of FIG. 7. The examples listed in the table refer to terminology known in the art. It should be noted, however, that the options presented in the table are for demonstration only, and should not be regarded as limiting.

Entering data may be performed using standard user interface controls such as text boxes, list boxes, comboboxes, or any other data insertion method which suits requirements according to the display media used for communicating with the user (for example standard screens, touch or multi-touch screens, appliance keypads, pointing devices, voice activated interfaces or the like). The display media may be presented on a local or a remote display unit, such as but not limited to various types of screens such as cathode ray tubes, liquid crystal displays (LCD) displays, light emitting diode (LED) displays, touch screens, plasma displays or the like integrated with remote terminal units, computers, laptops, PDAs, cellular phones or the like.

Displaying data to a user administrator may be used by a display unit integrated with a user's personal device. A network administrator may use a central display unit to view and control bot information relevant to a plurality of member assets in the network.

Figure 8:
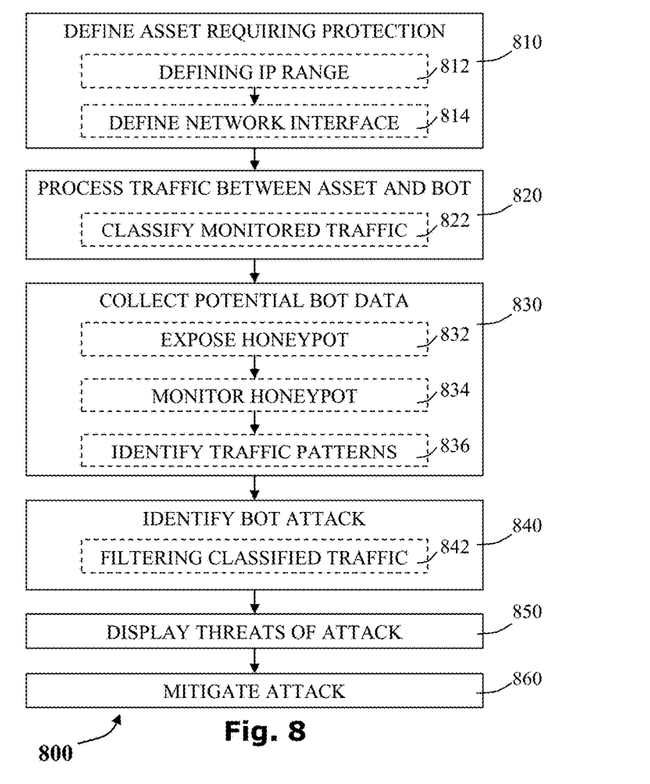
FIG. 8 is a flowchart representing the main processes in a method for protecting assets from becoming part of a botnet.

Referring now to the flowchart of FIG. 8, a bot protecting method 800 for protecting assets from becoming part of a botnet may require that a user or an administrator defines at least one asset which requires botnet protection 810, processing traffic sent to and from that asset and at least one bot-address pertaining to a criminal server 820, and identifying at least one bot attack pertaining to the asset 840. Defining the asset may involve defining at least one IP range 812 and/or defining a network interface representing the asset 814.

The method may further involve collecting potential bot data 830. Collecting bot data may comprise exposing at least one honeypot asset having at least one honeypot address to botnet traffic 832. The honeypot asset may be a virtual machine. Traffic from the honeypot asset to the criminal server will be referred to herein as honeypot traffic.

The honeypot traffic may be monitored 834. Patterns may be synthesized and identified from the honeypot traffic, the patterns typically indicative of bot-infected assets 836. The traffic can later be classified 842 into classified-traffic, optionally according to asset addresses, traffic dates, known patterns or any other classification scheme or combination of classification schemes which suits requirements.

The classified data may then be used to identify bot attacks pertaining to compromised assets selected from the assets defined by a user or an administrator as assets requiring botnet protection. Optionally, bot attacks are displayed to the user 850. The attacks are optionally classified in the display according to specific assets or asset groups. Bot attacks may be mitigated 860 automatically or manually, preferably according to administrators' preferences. Mitigation may comprise deleting malware from bot-infected assets by un-installing programs, deleting files and registry keys, or any other mitigation action.

The method as defined herein may be used as a futuristic detection and protection method superior even to zero-day attacks recognition. The analysis performed on the traffic may be used to identify potential attacks yet to be executed by criminal servers. The criminal servers may be in a latent state, but the analysis of traffic may identify them before they launch their attacks.

Figure 9:
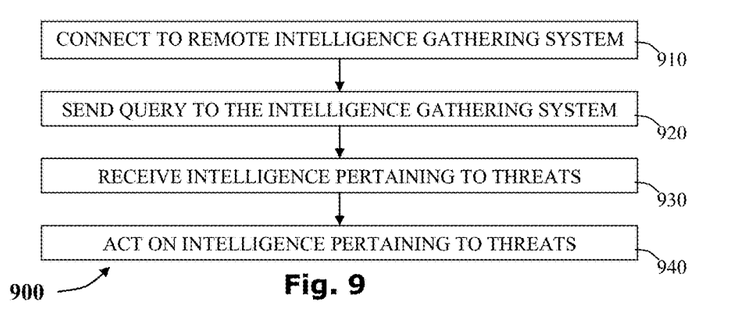
FIG. 9 is a flowchart representing the main processes in a method for protecting at least one client network from security threats.

Reference is now made to the flowchart of FIG. 9 representing the main methods of a method for protecting at least one client network from security threats 900. The method includes connecting to a remote intelligence gathering system 910, sending a query to the intelligence gathering system 920, the query relating to characteristics of the client network, receiving intelligence from the intelligence gathering system pertaining to the characteristics of the client network 930, and optionally acting on the received intelligence 940.

Such the intelligence gathered and presented by the system may include a variety of data relating to threats and vulnerabilities such as current and future IP addresses of the criminal server, current and future URLs of the criminal server, current and future domain names used by the criminal server, geographical locations of the security threat; frequencies and identities of vulnerabilities exploited by the malicious software, time stamps and such like.

Thus the disclosure hereinabove presents various methods and systems which may be used to protect networks against cyber threats, particularly from criminal servers, botnets and the like. The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method for use in a remote intelligence gathering system operable to provide intelligence to at least one network manager for protecting at least one asset from becoming part of at least one botnet, said intelligence comprising information relating to potential security threats to said at least one asset, said remote intelligence gathering system comprising at least one communication unit configured to receive data queries from said at least one network manager and to send said intelligence in response to said data queries;

the at least one asset having at least one client address and the botnet being controlled by at least one criminal server having at least one bot address, the botnet operable to communicate data between said at least one client address and said at least one bot address, the method comprising:

sending, by said network manager, at least one query relating to characteristics of said at least one asset;

receiving, by said network manager, said intelligence pertaining to the characteristics of said at least one asset;

defining automatically, by said network manager, said at least one asset which requires botnet protection, said at least one asset having at least one asset address;

processing traffic, by said network manager, sent to and from said at least one asset address and said at least one bot address;

identifying, by said network manager, at least one bot attack pertaining to said at least one asset; and generating, by said network manager, an indication associated with said at least one bot attack.

2. The method of claim 1, wherein defining automatically said at least one asset comprises defining at least one IP range representing said asset.

3. The method of claim 1, wherein defining said at least one asset comprises defining at least one network interface representing said asset.

4. The method of claim 1, further comprising gathering said intelligence by collecting potential bot data.

5. The method of claim 4, wherein collecting potential bot data comprises:

exposing at least one honeypot asset having at least one honeypot address to said traffic;

monitoring honeypot-traffic, said honeypot-traffic traveling between said at least one honeypot address and said at least one bot address; and identifying bot-traffic patterns from said honeypot-traffic, said bot-traffic patterns indicative of at least one bot-infected asset.

6. The method of claim 5, wherein processing traffic sent to and from said at least one asset address and said at least one bot address comprises:
classifying said traffic into classified-traffic, said classifying performed according to at least one IP range representing said at least one asset and according to said bot-traffic patterns.

7. The method of claim 2, wherein processing traffic sent to and from said at least one asset address and said at least one bot address comprises:
classifying said traffic into classified-traffic, said classifying performed according to said at least one IP range representing said at least one asset and according to bot-traffic patterns.

8. The method of claim 7, wherein identifying said at least one bot attack pertaining to said asset comprises filtering said classified-traffic according to said at least one asset address.

9. The method of claim 1, wherein generating said indication associated with said at least one bot attack comprises displaying said at least one bot attack pertaining to said at least one asset.

10. The method of claim 1, further comprising mitigating said at least one bot attack.

11. The method of claim 1, wherein said intelligence comprises at least one item selected from: at least one current IP address of said criminal server, at least one future IP address of said criminal server, at least one current URL of said criminal server, at least one future URL of said criminal server, at least one current domain name of said criminal server, at least one future domain name of said criminal server, at least one geographical location of said security threat; at least one vulnerability exploited by said malicious software, time stamps and combinations thereof.

* * * * *